US006938441B1

(12) United States Patent
Hájek et al.

(10) Patent No.: US 6,938,441 B1
(45) Date of Patent: Sep. 6, 2005

(54) METHOD AND APPARATUS FOR HEAT TREATMENT OF GLASS MATERIAL AND NATURAL MATERIALS SPECIFICALLY OF VOLCANIC ORIGIN

(75) Inventors: Milan Hájek, Prague (CZ); Jiři Drahoš, Prague (CZ); Václay Volf, Pardubice (CZ); Jaroslav Vozáb, Zivanice (CZ)

(73) Assignee: Ustav Chemických Procesů Akademie Věd České Republiky, Prague (CZ)

( * ) Notice: Subject to any disclaimer, the term of this patent is extended or adjusted under 35 U.S.C. 154(b) by 341 days.

(21) Appl. No.: 10/018,119

(22) PCT Filed: Jun. 12, 2000

(86) PCT No.: PCT/CZ00/00042

§ 371 (c)(1),
(2), (4) Date: Apr. 26, 2002

(87) PCT Pub. No.: WO00/78684

PCT Pub. Date: Dec. 28, 2000

(30) Foreign Application Priority Data

Jun. 17, 1999 (CZ) .......................... PV 1999-2185
Mar. 17, 2000 (CZ) ............................ PV 2000-968
May 25, 2000 (CZ) .......................... PV 2000-1935

(51) Int. Cl.[7] ............................................... C03B 32/00
(52) U.S. Cl. .......................................... 65/33.2; 508/11
(58) Field of Search .......................... 65/441, 474, 482, 65/33.2, 66; 588/201, 11, 252; 425/134; 219/68

(56) References Cited

U.S. PATENT DOCUMENTS 3,673,288 A * 6/1972 Childs, Jr. .................. 264/432
4,126,651 A * 11/1978 Valentine .................... 264/406
4,219,361 A * 8/1980 Sutton et al. ............. 501/96.1

(Continued)

FOREIGN PATENT DOCUMENTS

CA 2242893 7/1997
EP 0 349 405 1/1990

OTHER PUBLICATIONS

Derwent ACC No.: 1992-433558. Bienvenu (WO9221630), Dec. 10, 1992.*

(Continued)

*Primary Examiner*—Steven P. Griffin
*Assistant Examiner*—Lisa L. Herring
(74) *Attorney, Agent, or Firm*—Collard & Roe, P.C.

(57) ABSTRACT

A method of heat treatment of glass materials and natural materials specifically of volcanic origin according to which the treated material is exposed to microwave radiation at a frequency range from 1 MHz to 10 GHz and temperature range from the ambient temperature to 1800° C. in a batch or continuous process. The glass or natural material subjected to a melting and/or refining process contains an inert additive elected from the group comprising carbides, nitrides or borides in an amount from 1 to 100 g preferably 5 to 50 g per 1 kg of the glass or natural material. The apparatus consists substantially of a microwave furnace comprising an outer shell (8.2) provided with a cover (10) and an inner shell (8.1) and at least one micro wave generator (1.1, 1.2, 1.3, 1.4) with double emission and total power from 0.1 to 1 kW per 1 kg of the treated material.

7 Claims, 1 Drawing Sheet

U.S. PATENT DOCUMENTS

| | | | | |
|---|---|---|---|---|
| 4,399,544 | A * | 8/1983 | Monaghan | 373/35 |
| 4,490,287 | A * | 12/1984 | Hardwick et al. | 588/11 |
| 4,900,894 | A * | 2/1990 | Tanaka et al. | 219/121.59 |
| 5,304,701 | A * | 4/1994 | Igarashi | 588/201 |
| 5,822,879 | A | 10/1998 | Vincent et al. | |
| 6,408,649 | B1 * | 6/2002 | Sklyarevich et al. | 65/102 |

OTHER PUBLICATIONS

Corrosion and Chemical Resistant Masonry Materials Handbook, copyright 1986, p. 172.*

Gallawa, "The Purpose and Function of Interlock Switches", wayback machine pub date Jan. 21, 1998.*

Concrete Admixtures Handbook—Properties, Science, and Technology, 2nd edition, copyright 1995, pp. 657-669.*

F.G. Wihsmann, R. Kokoschko, K. Forkel (1996) "Glassmaker and Ceramicmaker", vol. 46, pp. 75-77. English Abstract Only.

M.P. Knox, G1.J. Copley, (1997) "Glass Technology", vol. 38, pp. 91-96.

* cited by examiner

METHOD AND APPARATUS FOR HEAT TREATMENT OF GLASS MATERIAL AND NATURAL MATERIALS SPECIFICALLY OF VOLCANIC ORIGIN

CROSS REFERENCE TO RELATED APPLICATIONS

Applicant claims priority under 35 U.S.C. §119 of Czech Republic Application Nos. PV 1999-2185, PV 2000-968, and PV 2000-1935 filed Jun. 17, 1999, Mar. 17, 2000, and May 25, 2000, respectively. Applicant also claims priority under 35 U.S.C. 365 of PCT/CZ00/00042 filed Jun. 12, 2000. The international application under PCT article 21(2) was published in English.

FIELD OF INVENTION

The invention relates to a method of heat treatment glass and natural materials specifically of volcanic origin. Under the heat treatment of glass materials it is to be understood melting or refining of glass cullet, glass batches or mixtures thereof or hardening or forming glass. The materials of volcanic origin such as basalt, granite, marble, andesite, syenite, etc. are accordingly subjected to melting or refining or hardening and forming to obtain utility goods such as floor tiles, wall tiles, rods, bars, fibers, insulating wool, artistic objects and various glassware etc. In addition, the invention relates to an apparatus for performing this method.

DESCRIPTION OF PRIOR ART

At the present time the melting of glass or production of glass melt or mother glass as well as melting of natural materials specifically of volcanic origin such as basalt is effected almost exclusively in glassmaking furnaces or melting furnaces heated by gas burners. Such furnaces show heavy weight and robustness. The furnace is to be heated as a whole and must be provided with thick insulation layers—fireclay what considerably affects its mobility i.e. the possibility of moving it from place to place for example for exhibition purposes. Moreover, the combustion of considerable amount of gas results in the generation of notably amount of hazardous flue gases affecting environment and also in strong heat radiation into the working place area what makes the working conditions unpleasant. There have been efforts to replace such glassmaking furnaces by electrically heated furnaces but due to specific parameter requirements such as temperature, glass output and energy consumption such efforts resulted in their limited use mostly for economic reasons. The requirement for quick melting of glass or natural materials by classic heating methods faces the main problem of considerably low thermal conductivity of such materials. In addition, certain types of glasses or materials especially those containing iron such as welding glass or basalt effectively reflect the infrared radiation so the temperature profile is sharply decreasing from the surface to the inside of the material so that the thickness of the batch material must be limited.

Attempts to make use of a micro wave technology has encountered serious difficulties since most types of glass are well transparent for micro wave i.e. glass does not absorb microwaves at the ambient temperature and has to be activated in some way i.e. make it capable to absorb microwaves. It is also known that at certain temperature—about 500° C. and more the positively charged particles of alkaline ions vibrating in the negative charged interstitial position begins to act as oscillating dipole which is the basic condition for absorption of microwaves. The pre-heating may be effected for example by electrical heating what of course requires a hybrid furnace i.e. a furnace provided with combined electric and microwave heating which design is relatively costly and restrictive in capacity. Some authors have used for the preheating of transparent materials such as asbestos and kieselguhr various additives capable to absorb microwaves, for example powdered iron, iron trichloride, or borax (F. G. Wihsmann, R. Kokoschko, K. Forkel, "Glassmaker and Ceramicmaker" 46 75 (1996). However, such materials proved to be unsuitable as additives to glass materials since they react with the glass mass and undesirably change the glass composition and structure. Other authors used for the batch preheating a microwave absorbing envelop or they hydrated the material before its melting (M. P. Knox, GI. J. Copley, "Glass technology" 38, 91 (1997). Neither these activating methods are perfect since by using a wave absorbing envelop the microwaves are hindered from penetrating into the batch and the heating is distributed by radiation as in the case of the classic heating processes. On the other hand with the majority of types of glass neither the hydration nor wetting provides sufficient means to warm up the batch to the temperature required.

According to EP-A1-0 349 405 micro waves are used for preheating or heating of materials such as oxides, glass and certain metals producing corrosive effect on the furnace lining when subjected to an induction heating. To enable preheating of materials that are not susceptible to micro waves glass containing iron oxides is added to the batch which oxide due to its high micro wave absorption provides for heating of the remaining micro-waves not susceptible materials. Nevertheless, such process is unacceptable for production of most of types of glass or natural materials based products since the iron oxide substantially affect the required qualities of final products.

The object of the invention is to provide a new method of heat treatment of glass materials and natural materials specifically of volcanic origin which enables melting, refining or hardening of such materials under specific conditions by applying the microwave technology in the full temperature range required and to all types of materials notwithstanding the composition or structure thereof.

Another object of the invention is to provide an apparatus for performing said method operated in both the batch or continuous process.

SUMMARY OF THE INVENTION

In accordance with the foregoing the treated material is exposed to microwave radiation at frequency range from 1 MHz to 10 GHz and temperature range from the ambient temperature to 1800° C. in a batch or continuous production process.

More specifically, the frequency of the microwave radiation is elected within the range from 1 to 100 MHz, preferably 27 MHz, from 500 MHz to 10 GHz preferably 896 MHz, 915 MHz and 2450 MHz.

To ensure safe and quick heating throughout the full temperature range the glass or natural material that is subjected to a melting and/or refining process contains an inert additive selected from the group comprising carbides, nitrides or borides in an amount from 1 to 100 g preferably 5 to 50 g per 1 kg of the glass or natural material.

More specifically, the inert additive is elected from the group consisting of tungsten carbide—WC, silicon carbide—SiC, boron carbide—$B_4C$, titanium carbide—TiC or vanadium nitride—VN, boron nitride—BN, silicon nitride—$Si_3N_4$ or titanium boride—$TiB_2$, niobium boride—$NB_2$, vanadium boride—$VB_2$, tungsten boride —$WB_2$, zirkonium boride $ZrB_2$, and aluminum boride $AIB_2$ or a mixture thereof.

The glass material may comprise glass cullet form common waste glass of any kind or glass batches of all types or mixtures of glass cullet and glass batch and the natural material may comprise basalt, granite, marble, andesite, syenite, and other materials absorbing the micro wave radiation.

An apparatus for performing the method consists substantially of a microwave furnace comprising an outer shell provided with a cover and an inner shell and at least one microwave generator with double emission and total power from 0.1 to 1 kW per 1 kg of the processed glass or natural material arranged substantially in the intermediate space in between the outer shell and inner shell and a tank disposed inside the inner shell.

The inner space of the furnace is advantageously filled up with a heat insulating material having a heat resistance up to 1750° C. elected from the group consisting of aluminum oxide—corrandum and silicon oxide—quartz and the furnace cover is provided with at least one safety switch and a fill neck engaging a contactless infrared sensor with a connection for transmitting its signal to a thermometer and controller provided with a microprocessor for the microwave generator control. To enable continuous process the tank is provided with a side or bottom tapping point. The easy mobility of the furnace is secured by transporting wheels mounted on the outer shell.

The method and apparatus according to the invention are based on the application of microwave energy for selective heating of glass, glass materials, natural materials especially of volcanic origin such as basalt, granite, marble etc. The applied technology may ensure that only the material required to be heated up is exposed to the heating effect uniformly in its whole volume while the adjacent space remains unaffected by the heat. In this way the supplied energy is used exclusively for melting, refining or hardening of the material required and it is not necessary to heat up the whole body of the furnace.

Another advantage of the invention results from applying inert materials (for example silicone carbide) as additives to the glass mass or batch. Such inert materials are strong absorbers of microwaves even at the ambient temperature while the properties of glass or natural materials remain unaffected. In this way any type of glass may be melted notwithstanding the extent to which the glass is capable to absorb microwaves as well as the glass composition and particles size including any glass batches or natural materials specifically of volcanic origin containing a metal for example. The melting process is extremely accelerated and is determined only by the heat resistance of a ceramic crucible. A metallic or graphite crucible cannot be used due to their unfavorable interaction with microwaves.

Any undesirable phenomena such as material loss or its oxidation by air oxygen are fully suppressed in the microwave melting process. The required properties of the material processed are completely preserved yet may be altered by a controlled modification of the melting regime. For example, by an appropriate application of the microwave energy in a glass batch melting process glass of different properties may be obtained that cannot be produced in the classic glassmaking furnaces (for example with respect to its morphology, microstructure or mechanical strength etc.).

The advantages of the invention based on the application of microwave heating technology including modified microwave furnace may be summarized as follows:

- quick and in volume heating—the in volume heating means the effect of microwaves to heat materials almost uniformly from the volume center to its outer border in contrast to the classic heating;
- selective heating—the selective heating means that only the material required is heated up while its surrounding remains cool;
- the furnace need not be permanently supplied by energy—the furnace may be switched on or off at any time, i.e. it need not be operated continuously;
- low electric energy consumption resulting in substantially lower operation costs—this benefit arises from the preceding attributes;
- harmless working conditions—no hazardous combustion gases are generated neither the temperature at the working place is increased.

In addition, besides for the mere melting purposes the furnace may be used for refining, hardening or forming of various glass materials, melting of several glass samples for example to serve the purpose of color decorations or processing of molten natural materials to produce utility goods such as floor tiles, wall tiles, rods, bars, fibers insulating wool artistic objects etc.

BRIEF DESCRIPTION OF DRAWINGS

The accompanying drawing shows a schematic vertical sectional view of one possible embodiment of the apparatus according to the invention.

DESCRIPTION OF THE PREFERRED EMBODIMENT

EXAMPLE 1

Figure 1:
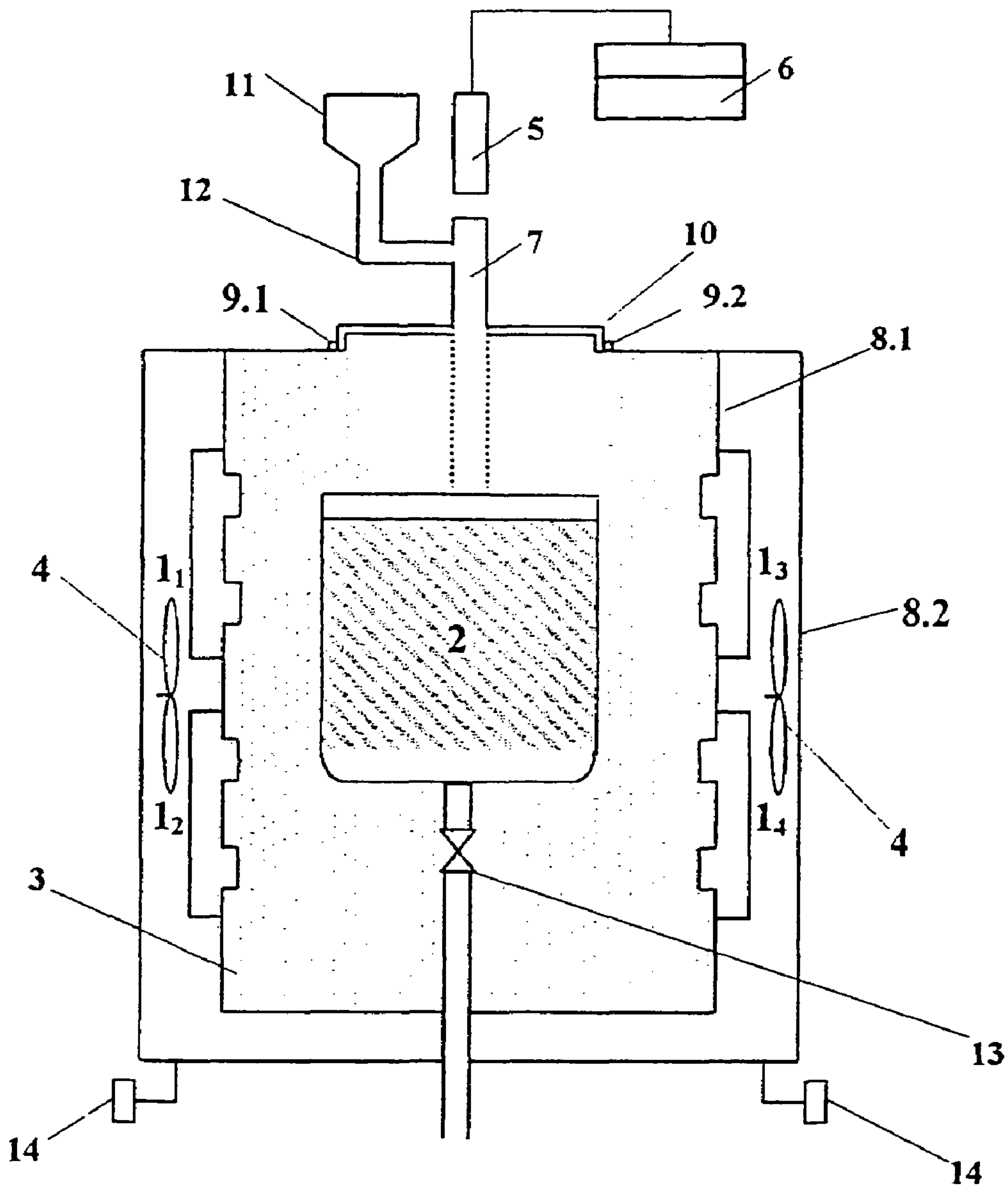

5 kg of crushed transparent glass cullet of particle size from 2 to 6 mm and 100 g of compact tungsten carbide (WC) were charged into a ceramic crucible with a capacity of 4 liters (l) in volume whereupon the crucible was put into a microwave furnace. After closing the furnace cover the crucible contents was heated up by means of microwave radiation with a frequency 2450 MHz and power 4 kW until the batch was melt. The glass melt was maintained at a temperature of 1200±50° C. and processed in forming various utility items.

EXAMPLE 2

2 kg of the mixture consisting of a lead crystal batch and 50 g of compact tungsten carbide (WC) were charged into a ceramic crucible with the capacity of 4 liters then the crucible was put into a microwave furnace. After closing the furnace cover the crucible contents was heated by microwave radiation at a frequency of 2450 MHz and power 2 kW until the glass was melted and then the glass melt was refined at a temperature of 1450° C. and thereafter at 1200±20° C. The glass melt was further maintained at this temperature and utilized in production of various utility items.

EXAMPLE 3

The glassmaking process according to example 2 was repeated under substantially the same conditions with the exception that as additives the following compounds were employed one after other: tungsten carbide—WC, silicon carbide —SiC, boron carbide—$B_4C$, titanium carbide—TiC or vanadium nitride—VN, boron nitride—BN, silicon nitride—$Si_3N_4$ or titanium boride—$TiB_2$, niobium boride—$NB_2$, vanadium boride—$VB_2$, tungsten boride—$WB_2$, zirkonium boride $ZrB_2$, and aluminum boride $AIB_2$.

EXAMPLE 4

10 kg of glass cullet originating from the waste packing glass such as bottles, jars etc. and 200 g of the compact tungsten carbide (WC) were placed inter a ceramic tank 10 liters by volume provided with a side or bottom tapping point. The tank was placed into a microwave furnace which was closed and switched on to run at the highest power. The glass cullet was melted and refined by the micro wave radiation effect and the glass melt was withdrawn through the bottom or a side tapping point to be further processed. The furnace was provided with inlet and outlet means so that the whole process could be carried out in a continuos mode.

EXAMPLE 5

5 kg of glass crushed basalt of particle size from 0.2 to 60 mm were put into a ceramic crucible with the capacity of 4 liters and the crucible was placed into a microwave furnace. After closing the furnace the batch in crucible was heated by a micro wave radiation at a frequency of 2450 MHz and power 4 kW until the batch was completely melted at a temperature of 1600° C. and then this temperature was reduced to 1200° C. The molten basalt was then maintained at 1200±20° C. and further processed in various utility goods.

EXAMPLE 6

8 kg of crushed basalt of particle size from 0.2 to 60 mm were put into a ceramic crucible having the capacity of 10 liters and the crucible was put into a microwave furnace. After closing the furnace the batch in the crucible was heated by microwave radiation at a frequency of 915 MHz until the batch was completely molten at a temperature 1400° C. and then this temperature was decreased to 1200° C. The molten basalt was then maintained at a temperature of 1200° C. and further formed by drawing to fibers or blowing to an insulating wool.

EXAMPLE 7

30 kg of natural material selected from the group consisting of basalt, granite, marble, optionally in mixture with additives selected from the group of carbides, nitrides and borides in an amount of 1 to 10% by weight for the purpose of accelerating of the melting were put into a ceramic tank with the capacity of 20 liters. The material was melted by the effect of microwave energy and maintained molten at a temperature from 1400 to 1450° C. and then withdrawn through a bottom outlet. Simultaneously, the amount of the withdrawn molten material was compensated by substantially continuous supply of a raw material wherein the feed rate was controlled in order to maintain a substantially constant volume of the molten material in the tank.

EXAMPLE 8

A batch or alternatively continuous operated glassmaking furnace comprises an outer shell 8.2 and an inner shell 8.1. The inner shell 8.1 defines a heat insulated inner space which is filled up with an insulating refractory material 3 of aluminum oxide—corundum. This material is permeable for microwaves even at high temperatures. Microwave generators called magnetrons 1.1, 1.2, 1.3, 1.4 are mounted on the inner shell 8.1 and extend into the intermediate space between the inner shell 8.1 and the outer shell 8.2. In this intermediate space fans 4 for cooling magnetrons 1.1-1.4, are located. The upper part of the glass furnace is provided with a cover 10 having an upwardly projecting fill neck 7. The fill neck 7 is connected over a conduit 12 to a storage reservoir 11 of batch material. The cover 10 is further provided by two safety switches 9.1, 9.2. The fill neck 7 is engaged with an infrared sensor 5 connected to a thermometer and temperature controller 6 equipped with a microprocessor for controlling the operation of the furnace. The bottom of the outer shell 8.2 is fitted with transport wheels 14. A tank 2 for receiving the batch material is situated in the insulated space its upper part being connected to the fill neck 7 while the bottom thereof is connected to the tapping point 13.

At least four micro waves generators—magnetrons 1.1–1.4 are installed to generate microwaves energy at a frequency of 2450 MHz with single or double emission in order to provide as much as possible homogenous electromagnetic field. The total microwave power may be adjusted with respect to the quantity of the natural material batch within the range from 2 to 6 kW, preferably 4 kW per 10 to 15 kg of the batch. The temperature of the molten material is measured by a contactless infrared sensor 5 and regulated by a thermometer coupled to a controller 6 equipped with a process controlling microprocessor. The mechanical safety switches 9.1 and 9.2 provided on the cover 10 prevent the microwave radiation from scattering into the furnace surroundings when the furnace is opened so that they switch off the energy supply to the magnetrons 1.1–1.4.

In operation, the batch material is supplied continuously or semi-continuously from the storage reservoir 11 to the tank 2 through the fill neck 12 where the batch material is melted and refined and subsequently withdrawn continuously or semi-continuously through the tapping point 13.

INDUSTRIAL APPLICABILITY

The invention may be used for melting or production of all types of glass and natural materials especially of volcanic origin notwithstanding the extent to which such materials are capable to absorb microwaves. The processes under invention in combination with a microwave furnace may be used in glass factories for laboratory purposes (for example for the preparation of common, modified or new types of glasses) for artistic purposes (production of artistic objects, replicas etc.) for decorative purposes (decoration of basic shapes with various kinds of colored glass).

In summary, the invention may be used in glass factories, laboratories, studious, artistic studious, home glass shops and similar works and in similar facilities for melting and processing basalt and like materials to produce insulating wool, fibers or utility items such as floor and wall tiles including without limitation vases, bowls and statues. Thanks to the easy mobility of the microwave furnace the inventive process and furnace may be used at exhibitions and fairs for demonstration of the production glassware and other goods of natural materials as a part of manufacturers promotion of their products as well as for teaching and training purposes at professional schools of applied and decorative arts.

What is claimed is:

1. A method of heat treatment of glass materials and natural materials of volcanic origin selected from the group consisting of basalt, granite, marble, andesite, and syenite, the method including melting and refining said glass and natural materials to form objects, comprising exposing the glass and natural materials to microwave radiation at a frequency range from 1 MHz to 10 GHz and at a temperature range from the ambient temperature to 1800° C. in a batch or continuous production process in a presence of an inert, microwave absorbing additive selected from the group consisting of carbides, nitrides, or borides in an amount from 1 to 100 g per 1 kg of the glass materials or natural materials.

2. The method of heat treatment of glass materials and natural materials of claim 1, wherein the frequency of microwave radiation is in a range selected from the group consisting of 1 to 100 MHz and 500 MHz to 10 GHz.

3. The method of heat treatment of glass materials and natural materials of claim 1, wherein the frequency of microwave radiation is selected from the group consisting of 27 MHz, 896 MHz, 915 MHz and 2450 MHz and the amount of the inert additive is from 5 to 50 g per 1 kg of the glass materials or natural materials.

4. The method of heat treatment of glass materials and natural materials of claim 3, wherein the inert additive is selected from the group consisting of tungsten carbide—WC, silicon carbide—SiC, boron carbide—$B_4C$, titanium carbide—TiC or vanadium nitride—VN, boron nitride—BN, silicon nitride—$Si_3N_4$ or titanium boride—$TiB_2$, niobium boride—$NB_2$, vanadium boride—$VB_2$, tungsten boride—$WB_2$, zirconium boride $ZrB_2$, and aluminum boride $AlB_2$ and a mixture thereof.

5. The method of heat treatment of glass materials and natural materials of claim 1, wherein the glass materials comprise cullet of common waste glass of any kind or glass batches of all types of mixtures of cullet and glass and glass batches.

6. An apparatus for heat treatment of glass materials and natural materials, comprising a microwave furnace comprising:

an outer shell provided with a cover and an inner shell and at least one microwave generator with double emission and a total output from 0.1 to 1 kW per 1 kg of the processed glass materials or natural materials arranged substantially in an intermediate space between the outer shell and the inner shell; and an insulating, material having a heat resistance up to 1750° C. and being selected from the group consisting of aluminum oxide—corundum and silicon oxide—quartz.

7. The apparatus of claim 6, wherein the tank is provided with a fill-neck and a side or bottom tapping point.

* * * * *